United States Patent [19]

Neymark et al.

[11] Patent Number: 5,759,703
[45] Date of Patent: Jun. 2, 1998

[54] ZERO VOC AQUEOUS DISPERSION OF AN ACID-MODIFIED POLYOLEFIN AND A MONOEPOXIDE/POLYMERIC ACID ADDUCT

[75] Inventors: Alexander L. Neymark, Chicago; David J. Miklos, Berwyn, both of Ill.

[73] Assignee: Bee Chemical Company, Lansing, Ill.

[21] Appl. No.: 548,121

[22] Filed: Oct. 25, 1995

[51] Int. Cl.$^6$ .............................. B32B 27/32; B32B 27/38
[52] U.S. Cl. ........................ 428/520; 428/413; 428/483; 428/516; 428/522
[58] Field of Search .................................... 523/402, 403, 523/407, 408; 428/515, 516, 518, 520, 413, 483; 524/802; 525/74, 78, 240, 241, 221, 208, 187, 190, 418, 451

[56] References Cited

U.S. PATENT DOCUMENTS

| | | | |
|---|---|---|---|
| 3,056,764 | 2/1962 | Graham et al. | 260/78.4 |
| 4,446,258 | 5/1984 | Chu et al. | 523/406 |
| 4,528,329 | 7/1985 | Inoue et al. | 525/74 |
| 5,565,525 | 10/1996 | Morimoto et al. | 525/259 |

FOREIGN PATENT DOCUMENTS

| | | |
|---|---|---|
| 0006334 | 1/1980 | European Pat. Off. . |
| 0006336 | 1/1980 | European Pat. Off. . |
| 22265626 | 3/1992 | United Kingdom . |
| 9012656 | 11/1990 | WIPO . |

OTHER PUBLICATIONS

Chemical Abstract 91: 58864e, "Modified Acrylic Polymer Coating Materials", 1979.

Primary Examiner—Paul J. Thibodeau
Assistant Examiner—D. Lawrence Tarazano
Attorney, Agent, or Firm—Robert M. Didrick; Henry W. Tarring, II; Gerald K. White

[57] ABSTRACT

An acid-modified polyolefin is dispersed in water by adding a hydroxy-functional ester made from a polymeric acid and a monoepoxide having from 14 to 46 carbon atoms to the water. Said dispersion is substantially zero-VOC. When a composition of this invention is applied to the surface and cured by baking the article at an elevated temperature, a coating is obtained which improves the adherence of subsequent coatings to a polyolefinic article. A polyolefinic article is one having a surface comprising polypropylene or a polypropylene modified with rubber called a thermoplastic polyolefin (TPO).

5 Claims, No Drawings

ZERO VOC AQUEOUS DISPERSION OF AN ACID-MODIFIED POLYOLEFIN AND A MONOEPOXIDE/POLYMERIC ACID ADDUCT

BACKGROUND OF THE INVENTION

This invention relates to aqueous dispersion of an acid-modified polyolefin and an adduct of a monoepoxide with a polymeric acid. More particularly, it relates to a coating composition which is an aqueous dispersion of an acid-modified polyolefin or acid-modified chlorinated polyolefin and a hydroxy-functional ester of a monoepoxide with a polymeric acid. When said dispersion is applied to the surface of a polyolefinic article and cured by baking the article at an elevated temperature, it improves the adherence of subsequent coatings to the article. Still more particularly, this invention relates to aqueous dispersions which are substantially free of volatile organic compounds (zero VOC).

The use of polypropylene and polypropylene-containing compounds modified with rubber called thermoplastic polyolefins (TPO) and other polyolefins has grown significantly in areas such as the automotive market since the 1970's because of their low cost, low weight, impact resistance, ease of molding and recyclability. They have been used in interior applications such as airbag covers and exterior ones such as fascia and trim. Because of their low surface energy and non-polar nature, however, an article having a polyolefinic resin on its surface is very difficult to paint with decorative and/or protective coatings. This surface must be physically or chemically altered to render it paintable with available coating technology. A common approach to the painting of polypropylene and TPO is the use of an adhesion promoting primer coating that uses a chlorinated polyolefin resins to gain adhesion to the surface. These coatings are easy to process in a production environment and can be topcoated after a short ambient flash or bake. However, solvent borne chlorinated polyolefin resins are sprayed at V.O.C.'s of 5.7 pounds per gallon or higher to properly coat the surface of the polypropylene or TPO. Because of increased environmental concerns, much effort has been directed to the problem of reducing the pollution caused by the evaporation of solvents from such coating compositions. Part of these efforts has been the development of new coating formulations which eliminate or at least diminish the emission of organic solvent vapors into the atmosphere. The dispersion of halogenated polyolefinic resins in water using conventional surfactants is taught in International Publication No. WO 90/12656.

Aqueous coating compositions comprising a dispersion of a polymer and a neutralized water-dispersible reaction product of an epoxy resin with a polymer containing carboxyl groups are taught by Chu et al in U.S. Pat. No. 4,446,258. A volatile organic solvent is used to dissolve the carboxyl-group containing polymer, the epoxy resin, and an amine so that the reaction takes place in solution. The ionic polymer thus prepared with the exemplary epoxy resins of Chu et al will not disperse an acid-modified polyolefin as defined herein.

Polymeric acids, as defined herein, are incompatible with said acid-modified polyolefins and cannot be used to disperse them in water. It has been found that the incompatibility of acid-modified polyolefins and the polymeric acids may be overcome for the purposes of dispersion of such polyolefins in water by using the hydroxy-functional ester made from such a monoepoxide and the polymeric acid as a dispersant. The resultant aqueous dispersion may be used as a coating composition for articles having a polyolefinic surface. The ester of the polymeric acid is a dispersant that cannot be leached out of a coating by water or organic solvents. The resultant primer coating in combination with conventional topcoats, moreover, has good water resistance and solvent resistance.

SUMMARY OF THE INVENTION

It is an object of this invention, therefore, to provide a zero VOC aqueous dispersion of an acid-modified polyolefin and an adduct of a monoepoxide with a polymeric acid.

It is a related object of this invention to provide an aqueous, zero VOC coating composition which promotes adhesion of a subsequent coating to a polypropylene-based substrate.

It is another object of this invention to provide such a coating composition containing a dispersant which is non-leachable from the resultant coating by water or an organic solvent.

It is another object of this invention to provide a coating composition in which both carboxyl- and hydroxyl functional sites for crosslinking are available.

It is another object of this invention to provide a coating composition whose versatility of formulation is similar to that of conventional water-based acrylic compositions.

It is another object of this invention to provide a coating composition having improved wetting and recoating characteristics.

It is another object of this invention to provide an article having a polypropylene-based surface which is coated with an aqueous, zero VOC coating composition containing a resin which, upon drying, promotes adhesion of a subsequent coating to the surface.

The above objects and other objects which will become apparent from the following description thereof are provided by an aqueous composition comprising a neutralized aqueous dispersion of an acid-modified polyolefin and an adduct of a monoepoxide having from 14 to 46 carbon atoms with a polymeric acid having a molecular weight of from about 1000 to about 20,000, preferably from about 3000 to about 7000.

DETAILED DESCRIPTION OF THE INVENTION

To facilitate the description and claiming of this invention, the term acid-modified polyolefin means an acid-modified polyolefin, an acid-modified chlorinated polyolefin, and mixtures thereof. They are either totally free of hydrophilic functional groups which would render them dispersible in water or their hydrophilic character is of such small degree as to have the same result.

A halogen-free, acid-modified polyolefin of this invention is a copolymer of a higher α-olefin and at least one monomer selected from the group consisting of ethylene and propylene, said copolymer having an α,β- unsaturated dicarboxylic acid, an anhydride, or half ester thereof grafted thereon. The olefin copolymer is a random copolymer or block copolymer of the ethylene and/or propylene with a higher α-olefin. A higher α-olefin is one having from 4 to 8 carbon atoms. Examples of the higher α-olefins include, butene-1, pentene-1, and hexene-1. Propylene/α-olefin copolymers suitable for use in this invention are available from Eastman Chemical Products, Inc. and from the Rexene Company. Ethylene/α-olefin copolymers suitable for use in this invention are available from Union Carbide under the trademark FLEXIMERS. They are exemplified by ethylene/butene, ethylene/hexene, and ethylene/butene/hexene copolymers.

The acid-modified chlorinated polyolefin of this invention is derived from a chlorinated polyolefin having a molecular weight of from 5000 to 30,000 and a chlorine content of from about 10 to about 30 weight percent. Said chlorinated polyolefin may be prepared according to known methods such as described in U.S. Pat. No. 4,070,421 which is hereby incorporated herein by reference. Chlorinated polyolefins are available commercially from Eastman Chemical Products and from Toyo Kasei Kogyo Co. Ltd.

The acid modification of the polyolefin and chlorinated polyolefin is accomplished by grafting it with maleic anhydride or maleic acid or another $\alpha,\beta$-unsaturated dicarboxylic acid, an anhydride thereof, or a half ester thereof. Suitable acids for that purpose are exemplified by fumaric acid, itaconic acid, citraconic acid, allylsuccinic acid, mesaconic acid and aconitic acid, and their acid anhydrides. The amount of $\alpha,\beta$-unsaturated dicarboxylic acid or the like is from about 1 to about 20% by weight of the grafted copolymer. If over 20% by weight, the grafting efficiency decreases.

Grafting of a $\alpha,\beta$-unsaturated dicarboxylic acid, an anhydride or half ester thereof onto the polyolefin may be conducted by a known method wherein the polyolefin is liquified by heating it above its melting point and the grafting is conducted in the presence of a free radical-generating agent such as a organic peroxide.

When using this method, a reactor equipped with an intensive agitator, Banbury mixer, kneader, extruder or the like may be employed and an $\alpha,\beta$-unsaturated dicarboxylic acid, its acid anhydride, or its half ester and a radical-generating agent (e.g., benzoyl peroxide) or a solution thereof in a low boiling solvent are added at a temperature of from about 150° C. to about 300° C.

The number average molecular weight (determined by gel permeation chromatography or GPC) of the halogen-free polyolefin after being grafted with the $\alpha,\beta$-unsaturated dicarboxylic acid or its acid anhydride is from about 3000 to 55,000. If over 55,000, dispersion into water becomes difficult because of high viscosity.

Maleated amorphous copolymers of propylene and hexene, of propylene and butene, and of propylene, butene, and ethylene that are suitable for the purposes of this invention are available from Eastman Chemical Products, Inc.

For the purposes of this invention, the term polymeric acid means a copolymer of acrylic and/or methacrylic acid and suitable co-monomers. Suitable co-monomers include styrene, vinyl acetate, vinyl chloride, vinylidene chloride, acrylonitrile, ethyl acrylate, butylmethacrylate, and similar acrylate esters. Copolymers of styrene and/or $\alpha$-methyl styrene and acrylic acid and/or methacrylic acid are examples. The polymeric acid has a number average molecular weight of from about 1000 to about 20,000, preferably from about 3000 to about 7000 and an acid number of from about 180 to about 240. The upper limit on the molecular weight is determined by the processability of the resulting ester. Dry grade polymers (i.e., containing less than 7 by weight of residual solvent) are preferred so that substantially solvent-free dispersions are produced in accordance with this invention. Polymers of this type are available from Morton International, Inc. and B. F. Goodrich, among others.

The monoepoxides suitable for this invention are represented by the formula

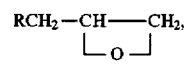

wherein R is an alkyl radical, an alkoxy radical, an alkylphenoxy radical, or an alkenylphenoxy radical, the alkyl, alkoxy, and alkenyl moieties each having from 12 to 40 carbon atoms. The choice of the monoepoxide is determined by the nature of the resin to be dispersed in water. Examples of the monoepoxides suitable for this invention include epoxidized $\alpha$-olefins containing a total of from 14 to 30 carbon atoms. They are prepared by reacting $\alpha$-olefins with organic peroxides such as peracetic acid or perbenzoic acid, or other peroxides such as hydrogen peroxide as described, for example, in U.S. Pat. No. 3,404,163. For some uses, such as promoting the adhesion of subsequent coatings to a polyolefinic substrate, the epoxidized $\alpha$-olefin preferably contains from 14 to 18 carbon atoms. Examples of such epoxidized $\alpha$-olefins include 1,2-epoxytetradecane, 1,2-epoxyhexadecane, and 1,2-epoxyoctadecane, and mixtures of two or each of the three. They are commercially available from Union Carbide Corporation. A monoepoxy-polybutene having a molecular weight of about 350 and sold by Aldrich Chemicals also exemplifies the monoepoxides useful for this invention, as do the epichlorohydrin adducts of monohydric alkylphenols, alkenylphenols, and long chain alcohols.

The esterification of the polymeric acid with the monoepoxide may be conducted by heating and stirring a mixture of the two reactants at from about 230° to about 360° F. (~110–182° C.) until the monoepoxide is substantially consumed. The weight ratio of the reactants is from about 10:90 to about 70:30, preferably at least about 20:80, equal amounts being more preferred. A preferred temperature is from about 300° to about 320° F. Completeness of the reaction may be observed by monitoring the acid number as it decreases throughout the reaction to approach the theoretical value based on the ratio of epoxy equivalents to acid equivalents in the reaction mixture. The reaction time ranges from about one to two hours. The desired polymeric, hydroxy-functional ester having an acid number of from about 50 to about 150, preferably from about 70 to about 110, is obtained.

The dispersion of the hydrophobic, acid-modified polyolefin in water is accomplished by mixing it with the hydroxy-functional ester of the polymeric acid at a temperature of from about 200° to about 230° F. (~90–110° C.) for about 30 minutes and then adding water and ammonium hydroxide or other base such as sodium hydroxide, potassium hydroxide, methylamine, ethylamine, propylamine, butylamine, hexylamine, octylamine, ethanolamine, propanolamine, diethanolamine, N-methyldiethanolamine, dimethylamine, diethylamine, triethylamine, N,N-dimethylethanolamine, 2-dimethylamino-2-methyl-1-propanol, 2-amino-2-methyl-1-propanol and morpholine. The use of organic amines is suitable only when the introduction of small amounts of VOC must be tolerated in order to achieve other desirable properties.

Neither conventional, low molecular weight surfactants nor co-solvents are necessary for dispersing the acid-modified polyolef in. Aqueous dispersions of acid-modified polyolefin resins that are substantially free of volatile organic compounds are preferred but a V.O.C. greater than zero pounds per gallon may be tolerated in accordance with this invention for special effects. A conventional surfactant may be used, also, when a special effect is desired.

The polyolefin surface may be that of an article made from a polyolefin or it may be that of a film on an article made from another material. The articles of particular interest for the purposes of this invention are polypropylene-based automotive parts that may be exposed to high humidity and may be subject to repeated contact with gasoline.

Pigments such as conductive carbon black, talc and other organic and inorganic pigments may be employed.

The invention is described in further detail in the following examples.

Grafting of Polyolefin with Maleic Anhydride

Example A

In a four-neck flask fitted with agitator, condenser and dropping funnel, 250 g of a propylene-butene copolymer (70 mol % propylene; $M_n$ 25,000; melt viscosity 8500 mPA.sec at 190° C.) sold as REXENE E-21 wax was liquefied by heating it to 430° F. (~220° C.). Then, keeping the temperature of system at 220° C., 20 g of maleic anhydride and 8 g of 5-di(t-butylperoxy) hexane in 15 g of methyl ethyl ketone (MEK) were added dropwise over one hour while agitating, and the reaction was continued for 0.5 hour. After the reaction, MEK was removed by flow of nitrogen and the acid grafted olefin copolymer (6% maleic anhydride by weight) was recovered after cooling. The number average molecular weight was 8000 when measured by GPC.

Example B

By a procedure similar to Example A, 20 g of maleic anhydride and 8 g of 5-di-(t-butyl peroxy)hexane in 15 grams of MEK were reacted with 250 g of EASTOFLEX D-174 propylene-hexene copolymer (propylene component 64 mol %; $M_n$ 55,000, melt viscosity 4000 centipoises at 190° C.) to obtain an acid grafted olefin copolymer (5.1% by weight grafted maleic anhydride). The number average molecular weight (CPC) of the product was 15,000.

Dispersion of Polymeric Acid in Water

EXAMPLE 1

A mixture of forty grams of a styrene/acrylic acid copolymer having an acid number of 210 and sold by Morton International, Inc. under its trademark and product number MOREZ 101 LS and 25 grams of 1,2-epoxyhexadecane (UNION CARBIDE EPOXIDE C-16) was stirred and heated at 290° F.(~143° C.) for one hour to give a hydroxy-functional ester having an acid number of 54 and then 60 parts of the modified polyolefin of Example A was added; this mixture was stirred and heated at 290° F.(143° C.) for 0.5 hour. After cooling the mixture to 210° F., a heated solution of 20 grams of concentrated ammonium hydroxide (28% ammonia) in 20 grams of water was added and then 260 grams of water at 200° F. was added to give an opaque dispersion.

EXAMPLE 2

A mixture of 80 grams of a styrene/acrylic acid copolymer having an acid number of 235 and sold by Morton International, Inc. under its trademark and product number MOREZ 300 and 25 parts of 1,2-epoxyhexadecane were stirred and heated at 310° F. (~154° C.) for one hour and then cooled to 230° F. (110° C.) to give a hydroxy functional ester; 80 grams of a chlorinated polyolefin EASTMAN CP 343-1) was added and this mixture was stirred and heated at that temperature for 10 minutes. After cooling the mixture to 210° F., a heated solution of 15 grams of concentrated ammonium hydroxide (28% ammonia) in 15 grams of water was added and then 270 grams of water at 200° F. was added to give a dispersion satisfactory for the purposes of this invention.

EXAMPLE 3

CARBOSET-1250 styrene/acrylic acid copolymer (acid number 235, B. F. Goodrich Company) (40 grams) and 25 grams of 1,2-epoxyhexadecane were mixed and heated at 310° F. for one hour to produce a hydroxy functional ester having an acid number of 60; 60 parts of PETROLITE KNF-26 modified polyolefin having an acid number of 58 (a copolymer of propylene and hexene-1 grafted with an isopropyl half ester of a maleic anhydride) were mixed with the hydroxy functional ester at that temperature for 0.5 hour. After cooling the mixture to 210° F., a heated solution of 20 grams of concentrated ammonium hydroxide (28% ammonia) in 20 grams of water was added and then 290 grams of water at 200° F. was added to give a viscous dispersion which is satisfactory for the purposes of this invention.

EXAMPLE 4

A mixture of 50 grams of MOREZ 300 styrene/acrylic copolymer having an acid number of 235 and 25 grams of polybutylene epoxide (molecular weight 365; ALDRICH) were mixed and heated at 310° F. for four hours to produce a hydroxy functional ester having an acid number of 110; 32.5 grams of an acid-modified, chlorinated polyolefin (MITSUBISHI RAYON S-645) was mixed into the hydroxy functional ester at that temperature for 10 minutes. After cooling the mixture to 210° F., a heated solution of 15 grams of concentrated ammonium hydroxide in 15 grams of water and 132 grams of hot water was added at about 200° F. to give a dispersion having a 40% non-volatile content.

EXAMPLE 5

A mixture of 40 grams of MOREZ 300 styrene/acrylic copolymer and 20 grams of 1,2-epoxyhexadecane was stirred at 310° F. (154° C.) for two hours to give the hydroxy functional ester having an acid number of 87 and was then cooled to 230° before 80 grams of the modified polyolefin of Example B was added; this mixture was stirred at 230° for 10 minutes. A solution of 15 grams of concentrated ammonium hydroxide in 15 grams of water was added to the mixture at 210° and then 300 grams of water was added at 200° to give a satisfactory dispersion for the purposes of this invention.

In the following examples, adhesion promoting thermoset coatings for a polypropylene-based surface were prepared and tested. The weight percent of all components marked with one or two asterisks is given in terms of solids present.

| | Concentration (Wt %) | |
|---|---|---|
| Component | Example 6 | Example 7 |
| Prod. of Example 2 | 22.8 | — |
| Prod. of Example 5 | — | 20.8 |
| Water | 73.2 | 74.6 |
| Ammonium hydroxide | 0.3 | 0.3 |
| Thixotrope* | 2.5 | 2.5 |
| Wetting agent | 0.2 | 0.2 |

-continued

| Component | Concentration (Wt %) | |
|---|---|---|
| | Example 6 | Example 7 |
| CYRACURE** | 0.6 | 1.0 |
| PTSA*† | 0.4 | 0.1 |

**Union Carbide trademark for a cycloaliphatic diepoxide curing agent
†p-toluene sulfonic acid After thorough mixing of the components, the coating compositions of Examples 6 and 7 were sprayed at approximately 60 psi onto separate TPO substrates to build a film of from 0.3 to 0.5 mil. The coated substrates were baked at 120° C. for approximately 10 minutes. After the baking cycle, the coated substrates were cooled to room temperature and then painted with a basecoat and a clearcoat, both of which were solvent-based, melamine-curing, thermosetting paints. A second TPO part having the cured coating of Example 7 on it was painted with an isocyanate-curing basecoat and clearcoat. Each of the painted parts was air dried at room temperature for about 10 minutes and the melamine-curing paint was baked at 120° C. for 30 minutes and the isocyanate-curing paint was baked at 82° C. for 30 minutes.

Adhesion of the paints to the coated substrates of this invention was determined by cross-hatch adhesion testing. The test consisted of cutting the painted surface with a fine cutter to form one hundred (100) cross-cuts at intervals of 1 mm each. After pressing a cellophane tape onto the painted surface and peeling it off at an angle of 180°, the number of remaining cross-cuts were counted. The results are given in TABLE 1.

Resistance of the painted parts to gasoline and to 100% relative humidity was also tested. Separate parts painted as described above were scribed with an X and then immersed in a synthetic gasoline consisting of 45% toluene and 55% VM&P naphtha by weight. Loss of paint was determined visually. Results are given in TABLE 1. Another set of parts was painted as described above and each painted part was X-scribed and placed in a cabinet held at 100% R.H. and 38° C. for 240 hours. Adhesion was tested by the tape pull described above. Results are given in TABLE 1.

TABLE 1

| Coating/ paints | Paint adhesion | Gasoline resistance | Humidity resistance |
|---|---|---|---|
| Ex. 6/melamine | 10 | 10 | 10 |
| Ex. 7/melamine | 10 | 10 | 10 |
| Ex. 6/isocyanate | 10 | 10 | 10 |

0 = poor
10 = excellent

With this description of the invention in detail, those skilled in the art will appreciate that modification may be made to the invention without departing from the spirit thereof. Therefore, it is not intended that the scope of the invention be limited to the specific embodiments that have been illustrated and described. Rather, it is intended that the scope to the invention be determined by the scope of the appended claims.

What is claimed is:

1. An article having a polyolefin resin surface covered with a coating comprising a cured mixture of an acid-modified polyolefin and a hydroxy-functional ester of a monoepoxide with a polymeric acid; said monoepoxide having from 14 to 46 carbon atoms and the general formula:

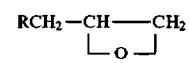

wherein R is an alkyl radical, an alkoxy radical, or an alkylphenoxy radical; and said polymeric acid having a number average molecular weight of from about 1000 to about 20,000 and an acid number of from about 180 to about 240.

2. The article of claim 1 wherein the molecular weight of the polymeric acid is from about 3000 to about 20,000.

3. The article of claim 2 wherein the molecular weight of the polymeric acid is from about 3000 to about 7000.

4. The article of claim 1 wherein the alkyl, alkoxy, and alkenyl moieties each have from 12 to 40 carbon atoms.

5. The article of claim 1 wherein the monoepoxide is an epoxidized α-olefin having from 14 to 30 carbon atoms.

* * * * *

UNITED STATES PATENT AND TRADEMARK OFFICE
CERTIFICATE OF CORRECTION

PATENT NO. : 5,759,703
DATED : June 2, 1998
INVENTOR(S) : NEYMARK et al.

It is certified that error appears in the above-indentified patent and that said Letters Patent is hereby corrected as shown below: On the title page, item [54] and col. 1, line 1-4

Title change "ZERO VOC DISPERSION OF AN ACID-MODIFIED POLYOLEFIN AND A MONOEPOXIDE/POLYMERIC ACID ADDUCT" to read -- POLYOLEFIN ARTICLES HAVING A CURED COATING COMPRISING MONOEPOXIDE/ACID ADDUCTS --.

Signed and Sealed this

Twenty-ninth Day of June, 1999

Attest:

Q. TODD DICKINSON

*Attesting Officer*   *Acting Commissioner of Patents and Trademarks*